United States Patent
Schertz et al.

(10) Patent No.: US 11,204,251 B2
(45) Date of Patent: Dec. 21, 2021

(54) ROUTING IN NAVIGATION APPLICATIONS BASED ON RESTORATIVE SCORE

(71) Applicant: The University of Chicago, Chicago, IL (US)

(72) Inventors: Kathryn E. Schertz, Chicago, IL (US); Omid Kardan, Chicago, IL (US); Marc G. Berman, Chicago, IL (US); Thomas N. Kompare, Chicago, IL (US)

(73) Assignee: The University of Chicago, Chicago, IL (US)

( * ) Notice: Subject to any disclaimer, the term of this patent is extended or adjusted under 35 U.S.C. 154(b) by 248 days.

(21) Appl. No.: 16/418,522

(22) Filed: May 21, 2019

(65) Prior Publication Data

US 2019/0360821 A1    Nov. 28, 2019

Related U.S. Application Data

(60) Provisional application No. 62/676,630, filed on May 25, 2018.

(51) Int. Cl.
*G01C 21/34* (2006.01)
*G01C 21/36* (2006.01)

(52) U.S. Cl.
CPC ....... *G01C 21/343* (2013.01); *G01C 21/3461* (2013.01); *G01C 21/3476* (2013.01); *G01C 21/3614* (2013.01)

(58) Field of Classification Search
CPC .............. G01C 21/343; G01C 21/3453; G01C 21/3461; G01C 21/3476; G01C 21/3484; G01C 21/3614
See application file for complete search history.

(56) References Cited

U.S. PATENT DOCUMENTS

| | | | |
|---|---|---|---|
| 8,090,532 B2 * | 1/2012 | Tashev | G01C 21/3461 701/433 |
| 9,142,141 B2 * | 9/2015 | Yeh | G06F 3/017 |

(Continued)

OTHER PUBLICATIONS

Schertz et al., "A thought in the park: The influence of naturalness and low-level visual features on expressed thoughts", Science Direct—Cognition, 2018, 12 pages.

(Continued)

*Primary Examiner* — Ryan Rink
(74) *Attorney, Agent, or Firm* — McDonnell Boehnen Hulbert & Berghoff LLP

(57) ABSTRACT

An embodiment may involve obtaining data representing a transportation map, a greenspace map, a noise map, and a crime map of a geographical location. The transportation map represents route segments within the geographical location, the greenspace map represents natural features within the geographical location, the noise map represents human-made noise within the geographical location, and the crime map represents reported crimes within the geographical location. The embodiment may also involve, for each of the route segments: (i) calculating a restorative score that is proportional to an amount of natural features associated with the respective route segment in the greenspace map, inversely proportional to an amount of human-made noise associated with the respective route segment in the noise map, and inversely proportional to an amount of crime associated with the respective route segment in the crime map.

19 Claims, 11 Drawing Sheets

(56) References Cited

U.S. PATENT DOCUMENTS

| | | | |
|---|---|---|---|
| 9,927,252 B1* | 3/2018 | Chokshi | G01C 21/3461 |
| 10,909,847 B1* | 2/2021 | Libin | G08G 1/0965 |
| 2008/0293430 A1* | 11/2008 | Blom | G01C 21/3484 |
| | | | 455/456.1 |
| 2009/0089149 A1* | 4/2009 | Lerner | G06Q 10/047 |
| | | | 705/7.34 |
| 2010/0036599 A1* | 2/2010 | Froeberg | G01C 21/3461 |
| | | | 701/532 |
| 2013/0080053 A1* | 3/2013 | Rakshit | G01C 21/3461 |
| | | | 701/527 |
| 2015/0112581 A1* | 4/2015 | Hakim | G01C 21/3415 |
| | | | 701/400 |
| 2017/0030726 A1* | 2/2017 | French | G01C 21/3461 |
| 2017/0067750 A1* | 3/2017 | Day | B60G 17/015 |
| 2017/0199045 A1* | 7/2017 | George | G01C 21/3461 |
| 2017/0213273 A1* | 7/2017 | Dietrich | G01C 21/3461 |
| 2018/0004211 A1* | 1/2018 | Grimm | G05D 1/0214 |
| 2018/0239359 A1* | 8/2018 | Jian | B60W 50/14 |
| 2018/0364059 A1* | 12/2018 | Calinao | G01C 21/3629 |
| 2019/0049261 A1* | 2/2019 | Colby | G01C 21/3484 |
| 2019/0385583 A1* | 12/2019 | Muggleton | H04R 29/004 |
| 2020/0026279 A1* | 1/2020 | Rhodes | G01C 21/3476 |
| 2020/0307647 A1* | 10/2020 | Bader | B60W 60/00133 |
| 2020/0309545 A1* | 10/2020 | Michel | G01C 21/3667 |
| 2020/0318983 A1* | 10/2020 | Shirani-Mehr | H04W 4/02 |
| 2020/0355508 A1* | 11/2020 | Bruns | G01C 21/3461 |

OTHER PUBLICATIONS

Morris et al., "Walking to Health", Sports Med, 1997, 23(5), 306-332.

Berman et al., "The Cognitive Benefits of Interacting with Nature", Association for Psychological Science, 2008, 19(12), 1207-1212.

Bratman et al., "The impacts of nature experience on human cognitive function and mental health", Annals of the New York Academy of Sciences 1249, 2012, 118-136.

Beyer et al., "Exposure to Neighborhood Green Space and Mental Health: Evidence from the Survey of the Health of Wisconsin", International Journal of Environmental Research and Public Health, 2014, vol. 11, 3453-3472.

Kardan et al., "Neighborhood greenspace and health in a large urban center", Scientific Reports, 2015, 15 pages.

* cited by examiner

OBTAIN DATA REPRESENTING A TRANSPORTATION MAP, A GREENSPACE MAP, A NOISE MAP, AND A CRIME MAP OF A GEOGRAPHICAL LOCATION, WHEREIN THE TRANSPORTATION MAP REPRESENTS ROUTE SEGMENTS WITHIN THE GEOGRAPHICAL LOCATION, WHEREIN THE GREENSPACE MAP REPRESENTS NATURAL FEATURES WITHIN THE GEOGRAPHICAL LOCATION, WHEREIN THE NOISE MAP REPRESENTS HUMAN-MADE NOISE WITHIN THE GEOGRAPHICAL LOCATION, AND WHEREIN THE CRIME MAP REPRESENTS REPORTED CRIMES WITHIN THE GEOGRAPHICAL LOCATION ← 700

FOR EACH OF THE ROUTE SEGMENTS: (I) CALCULATE A RESTORATIVE SCORE, WHEREIN THE RESTORATIVE SCORE IS PROPORTIONAL TO AN AMOUNT OF NATURAL FEATURES ASSOCIATED WITH THE RESPECTIVE ROUTE SEGMENT IN THE GREENSPACE MAP, INVERSELY PROPORTIONAL TO AN AMOUNT OF HUMAN-MADE NOISE ASSOCIATED WITH THE RESPECTIVE ROUTE SEGMENT IN THE NOISE MAP, AND INVERSELY PROPORTIONAL TO AN AMOUNT OF CRIME ASSOCIATED WITH THE RESPECTIVE ROUTE SEGMENT IN THE CRIME MAP, AND (II) STORE, IN A DATABASE, THE RESTORATIVE SCORES AS CALCULATED ALONG WITH EACH RESPECTIVE ROUTE SEGMENT ← 702

FIG. 7

ROUTING IN NAVIGATION APPLICATIONS BASED ON RESTORATIVE SCORE

CROSS-REFERENCE TO RELATED APPLICATION

This application claims priority to U.S. provisional patent application No. 62/676,630, filed May 25, 2018, which is hereby incorporated by reference in its entirety.

STATEMENT REGARDING FEDERALLY SPONSORED RESEARCH OR DEVELOPMENT

This invention was made with government support under Grant Number BCS1632445 awarded by the National Science Foundation. The government has certain rights in the invention.

BACKGROUND

Computerized mapping applications are software programs that typically display a visual representation of a physical location, including geographic features (e.g., lakes, rivers, hills, forests) and transportation-related features (roads, trails, paths, transit routes) of the location. In some cases, human-made features, such as buildings and other structures, may be represented as well. When used for navigation, the application receives indications of where a route is to begin (e.g., where the user currently is located), where the route is to end (e.g., where the user would like to go), and any waypoints therebetween. The application then suggests one or more routes that are expected to either minimize travel time, travel distance, travel cost, or some combination thereof. The application may allow the user to specify one or more particular transportation modalities (e.g., walking, biking, public transportation, driving) to use for route suggestion.

This information may be determined by a client device (e.g., a smartphone, tablet, laptop, or desktop computer) configured to execute the application. Alternatively, the application functionality may be split between the client device and a server device in communication with the client device by way of a computer network. In either case, the client device may graphically display the map for visual inspection of the user, and the displayed map may highlight the suggested route(s).

SUMMARY

The embodiments herein introduce a restorative score, a new criterion for route suggestion in navigation applications. The restorative score reflects how well a route may be able to restore cognitive abilities and also mood. The restorative score is based on a number of metrics including the "naturalness" of a suggested route, which is influenced by the route's proximity to greenspace and/or vegetation, noise levels, and crime rates. In urban and suburban areas, a route based on restorative score (in addition to other factors) can provide an anxiety-reducing and safe option for exercise, commuting, or other goals, while simultaneously seeking to improve psychological functioning.

Research has shown that exposure to natural environments can increase cognitive functioning, mood, and positive reflection. Furthermore, being near greenspace is associated with improved physical and mental health. Moreover, walking has cardiovascular and musculoskeletal health benefits. Thus, even if a suggested route with a relatively high restorative score is a certain extent longer than a navigation application's shortest route, it is likely be preferable for many users.

Accordingly, a first example embodiment may involve obtaining data representing a transportation map, a greenspace map, a noise map, and a crime map of a geographical location, where the transportation map represents route segments within the geographical location, where the greenspace map represents natural features within the geographical location (such as trees), where the noise map represents human-made noise (including machine noise) within the geographical location, and where the crime map represents reported crimes within the geographical location. The first example embodiment may also involve, for each of the route segments: (i) calculating a restorative score, where the restorative score is proportional to an amount of natural features associated with the respective route segment in the greenspace map, inversely proportional to an amount of human-made noise associated with the respective route segment in the noise map, and inversely proportional to an amount of crime associated with the respective route segment in the crime map, and (ii) storing, in a database, the restorative scores as calculated along with each respective route segment.

A second example embodiment may involve receiving, by way of a client device, a request for a navigation map between two points in a geographic location. The second example embodiment may also involve obtaining, from a database, a restorative map of route segments that includes a restorative score respectively associated with each of the route segments, where the restorative score is proportional to an amount of natural features associated with the respective route segment, inversely proportional to an amount of human-made noise associated with the respective route segment, and inversely proportional to an amount of crime associated with the respective route segment. The second example embodiment may also involve calculating one or more suggested routes between the two points, each suggested route associated with an aggregate restorative score based on the restorative scores of individual route segments within the respective suggested route. The second example embodiment may also involve, based on the aggregate restorative scores, displaying at least one of the suggested routes on a graphical user interface of the client device.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing device may include a processor and memory. Program instructions, stored in the memory, upon execution by the processor may cause the computing device to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed,

BRIEF DESCRIPTION OF THE DRAWINGS

FIG. 5A depicts a portion of overlaid data from a greenspace map, a noise map, and a crime map, in accordance with example embodiments.

FIG. 7 is a flow chart, in accordance with example embodiments.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. EXAMPLE COMPUTING DEVICES AND CLOUD-BASED COMPUTING ENVIRONMENTS

The following embodiments describe architectural and operational aspects of example computing devices and systems that may employ the disclosed navigation implementations, as well as the features and advantages thereof.

Figure 1:
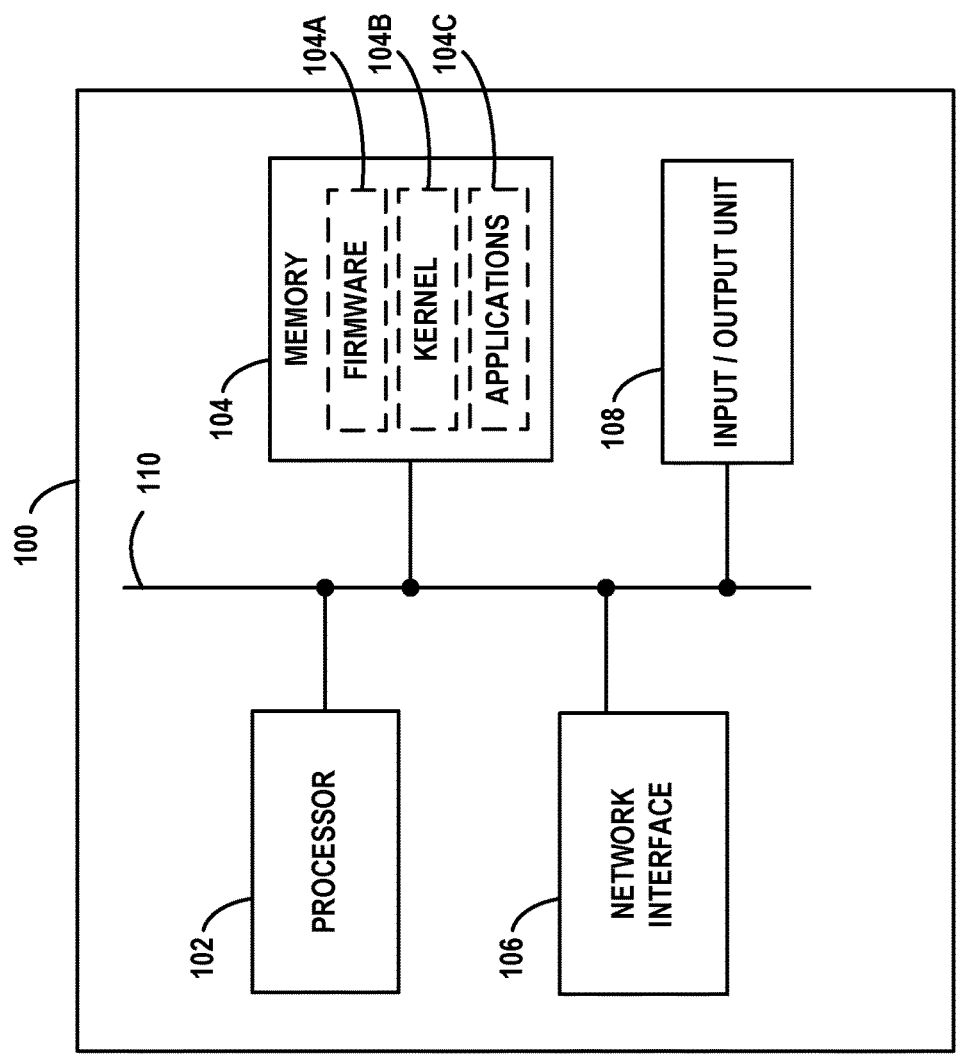
FIG. 1 illustrates a schematic drawing of a computing device, in accordance with example embodiments.

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples. Computing device 100 may include fixed memory as well as one or more removable memory units, the latter including but not limited to various types of secure digital (SD) cards. Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as navigation applications, mapping applications, web browsers or email clients, as well as any software libraries used by these programs. (For sake of convenience, hereinafter the terms "navigation application" and "mapping application" will be used interchangeably.) Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
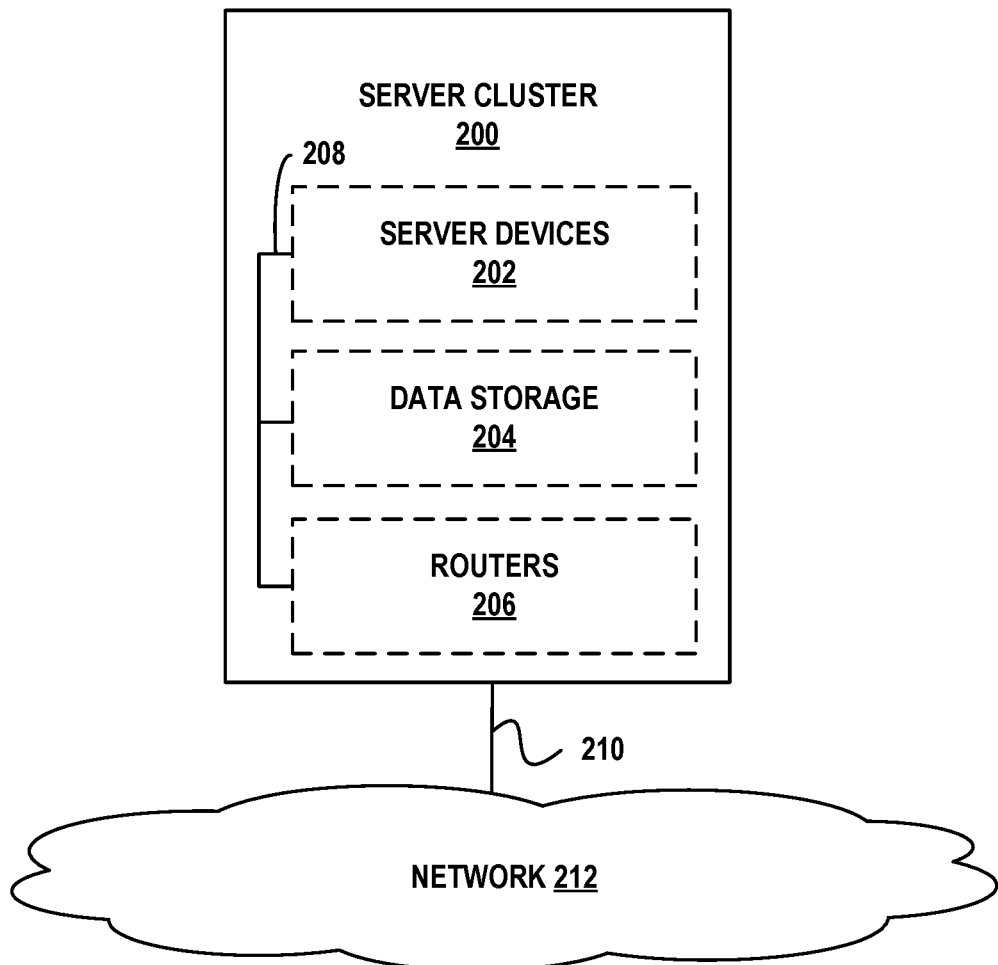
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

In some possible embodiments, a navigation application may be configured to execute on computing device 100 in a standalone fashion. Thus, the navigation application may include a map database and program code that displays selected portions of the information in this database on the screen of computing device 100, possibly with one or more suggested routes. In alternative embodiments, the map database may be stored on server cluster 200 (or any cloud-based server device) and the navigation application may dynamically retrieve portions of the map as needed to support route calculation and display. Thus, the division of labor between client and server devices may vary based on numerous factors.

II. MAP DATA

Map data can be organized and stored in various ways. For instance, a scalable map may include spatial data related to roads, railroad lines, polygonal boundaries, hydrography, etc. However, maps might not be rendered directly from this data for every user request, because doing so would require extensive processing resources to serve a large volume of requests. Instead, tiles of the maps may be rendered offline using the spatial data, and stored as images so they can be retrieved quickly. The tiles are generated for different zoom levels so that more detail shows up at different levels. Since lower zoom levels may have a significant number (e.g., millions) of tiles, but are rarely visited, those may be generated at viewing time, instead of being pre-generated. Navigation applications then request all the relevant tiles over a given viewing area and zoom level, and piece these tiles together to generate a complete map for displaying on a client device.

A user may request that a navigation application provide suggested routes from a first (e.g., initial) location to a second (e.g., destination) location. In some embodiments, the navigation application represents route segments (e.g., portions of streets or paths) between intersections as edges and the intersections as vertices in a graph. Then one of any available shortest path algorithm (e.g., Dijkstra's algorithm) can be used to provide one or more suggested routes based on various criteria. For instance, each of the edges may be weighted in accordance with the length or expected travel time of its corresponding route segment, and the algorithm may seek to recommend routes that minimize these weights. In some cases, intersections may be associated with weights as well to represent any delay expected to be experienced when traversing the intersection, such as having to wait at a traffic light.

Figure 3:
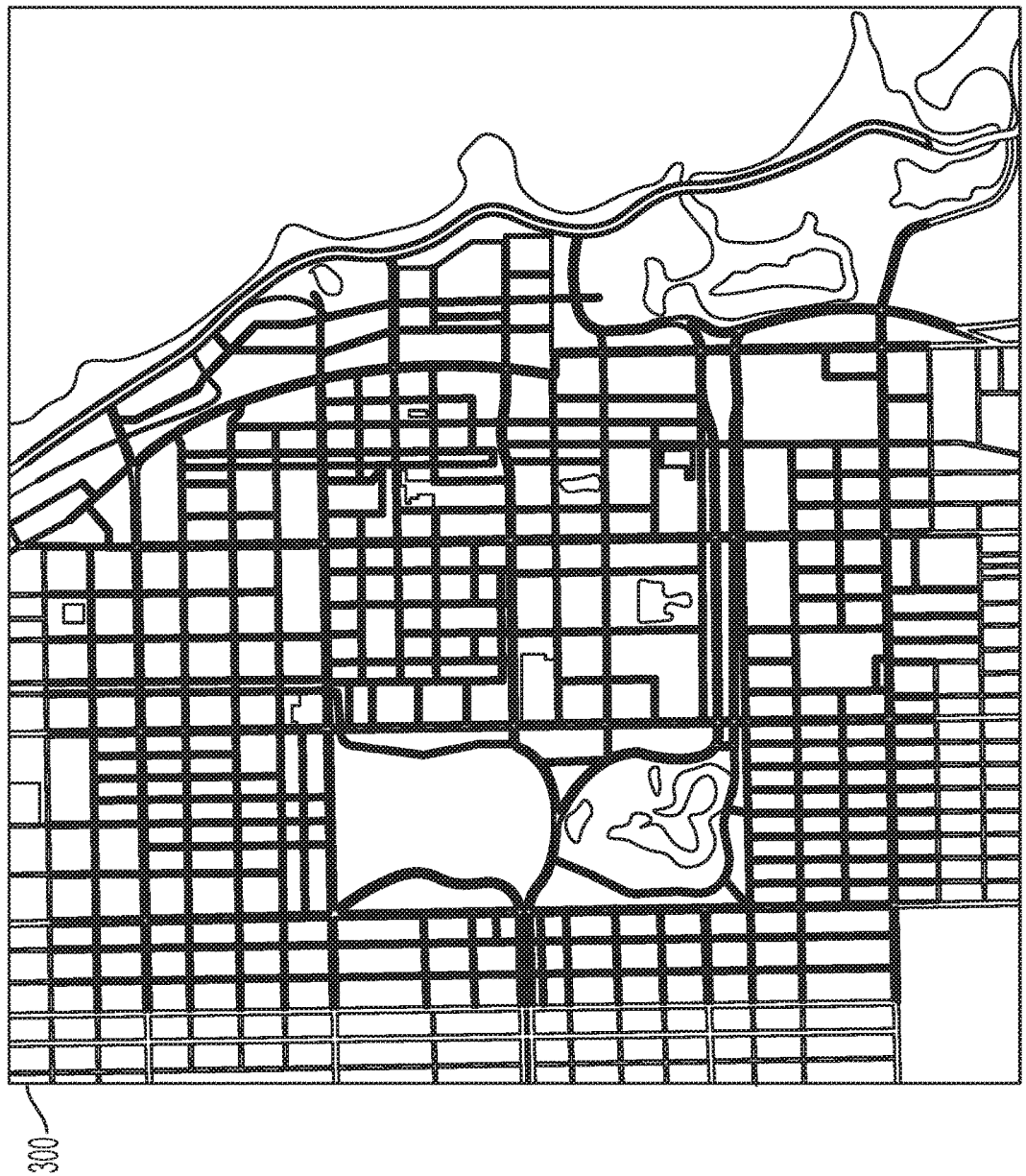
FIG. 3 depicts a map displayed by a navigation application, in accordance with example embodiments.

An example map 300 is shown in FIG. 3. Map 300 represents the geography and transportation features of Hyde Park, Ill. and surrounding neighborhoods. Map 300 may be derived from one or more tiles, and when displayed on a client device, the user may be able to zoom in and/or out. In some cases, map 300 may be considered to be a transportation map because it features streets, roads, highways, railroad lines, trails, sidewalk paths, walking paths, and/or biking paths. In order to help determine a restorative score for suggested routes, one or more overlay maps may be used in conjunction with map 300.

Figure 4A:
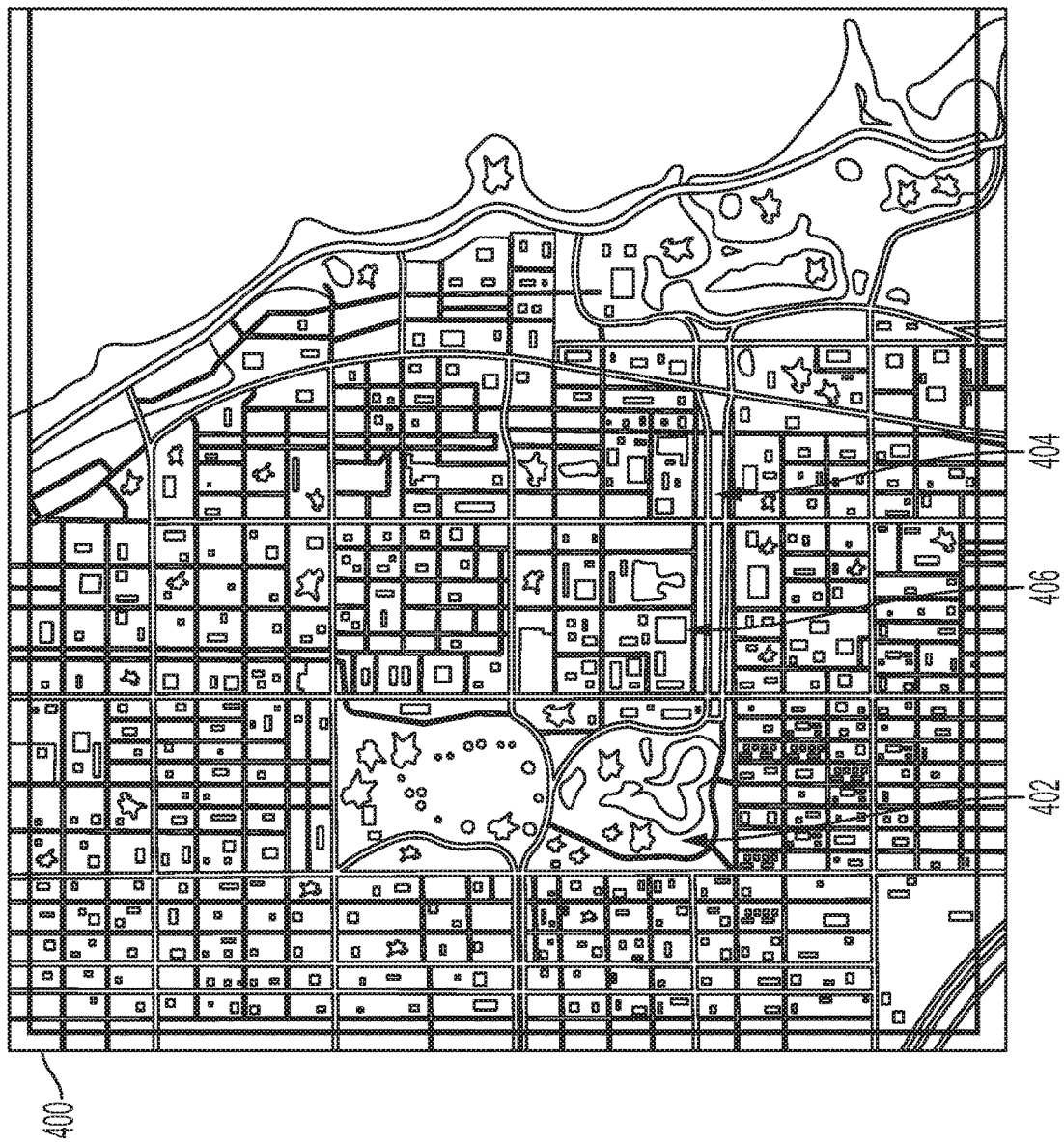
FIG. 4A depicts a greenspace map, in accordance with example embodiments.

As one possible example, FIG. 4A depicts a greenspace map 400. Individual tiles of map 400 may be coded in order to differentiate between open areas with an abundance of natural features (e.g., trees, grass, ponds, lakes, rivers) and areas that lack these features (e.g., houses, apartment buildings, businesses, malls, factories, roads, railroads, etc.). These "natural features" may, in some cases, include both human-designed and natural greenspace. For instance, on map 400, tiles of park 402 and midway 404 may be coded as exhibiting more greenspace than tiles of buildings 406. The data in map 400 may be gathered from various sources. It could be crowdsourced, based on terrestrial or aerial photographs, other information, or some combination thereof.

In some embodiments, each 2-foot by 2-foot square patch of the map may have an individually calculated greenspace value. This value may be derived from street-level photographs of the area. Thus, a route segment, such as a city block, may have a greenspace value that is the average or some aggregation of these individual values. Nonetheless, other patch (tile) sizes may be used.

The coded greenspace values may be within a predefined range. For example, the predefined range could be 0 to 100, increasing with the amount of greenspace. Thus, a greenspace value near 0 indicates an almost complete lack of greenspace on a tile, while a greenspace value near 100 indicates that the tile consists of almost nothing but greenspace. Other ranges could be used. In some embodiments, the quality of the greenspace may be taken into account. For instance, a greenspace value may be higher for nature greenspaces than for human-designed greenspaces, and/or higher for well-manicured human-designed greenspaces than for unkept human-designed greenspaces.

Figure 4B:
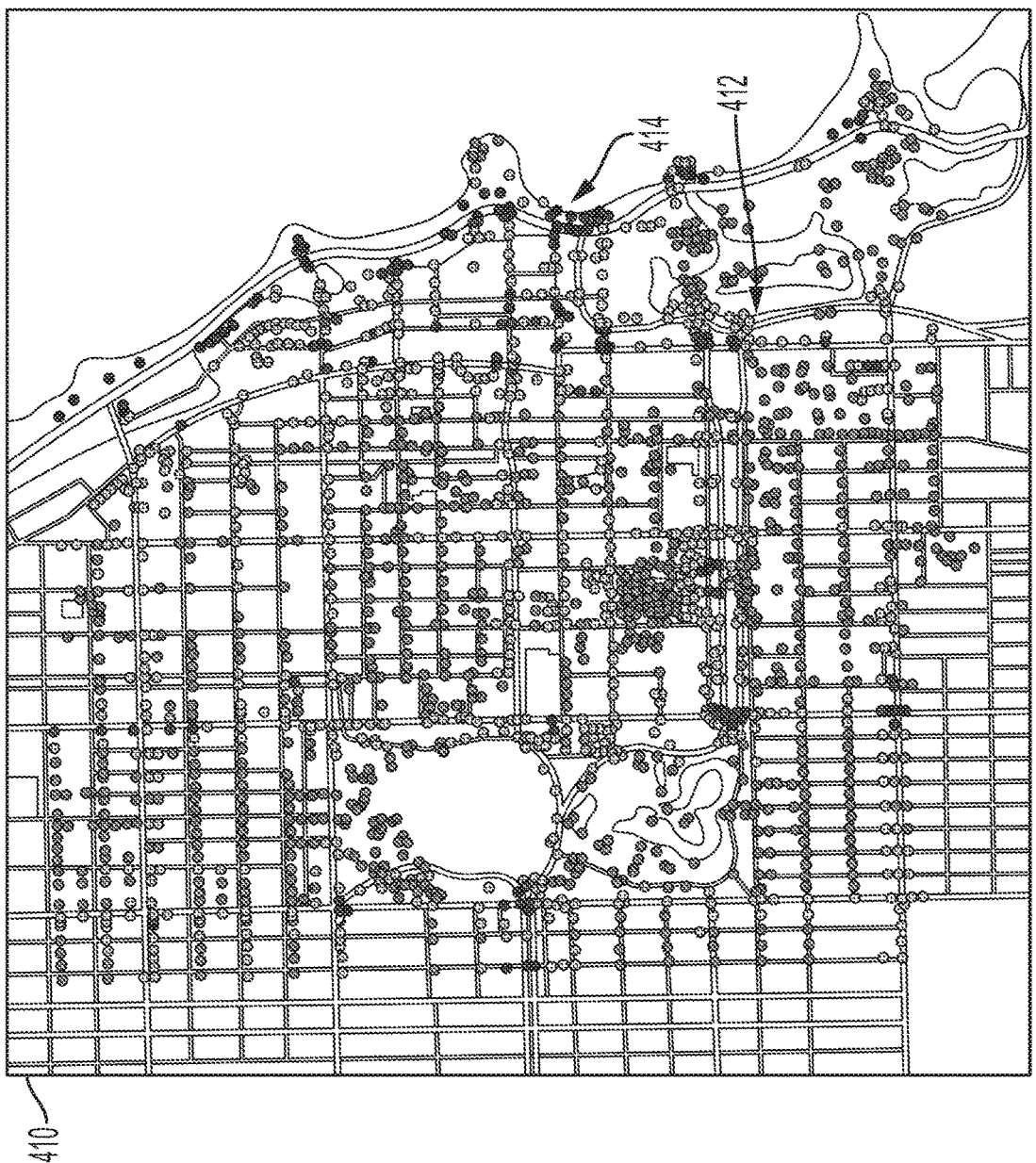
FIG. 4B depicts a noise map, in accordance with example embodiments.

As another example, FIG. 4B depicts a sound map 410. Individual points on map 410 (which may refer to global positioning satellite (GPS) readings) may be coded in order to differentiate between quiet and loud areas. These points may appear as dots in FIG. 4B. Noises may be due to vehicle traffic, air traffic, and local sources (e.g., commercial, public, or residential noise). In some embodiments, only unnatural (human-made) noise may be considered. For instance, on map 410, points near lake 412 may be coded as quieter (lighter shaded dots) than points near of highway 414 (darker shaded dots). The data in map 410 may be gathered from various sources. It could be crowdsourced, based on surveys of residents, or measured in a more objective fashion. A route segment, such as a city block, or a tile of the map may have a noise value that is the average or some aggregation or the noise values on or within a threshold distance of the route segment or tile.

The coded noise values may be within a predefined range. For example, the predefined range could be 0 to 100, decreasing with the amount of noise. Thus, a noise value near 0 indicates an extreme amount of noise found on a tile and may be visually represented with one or more darkly shaded dots, while a noise value near 100 indicates that the tile is almost completely quiet and may be visually represented with one or more lightly shaded dots. Other ranges could be used.

Figure 4C:
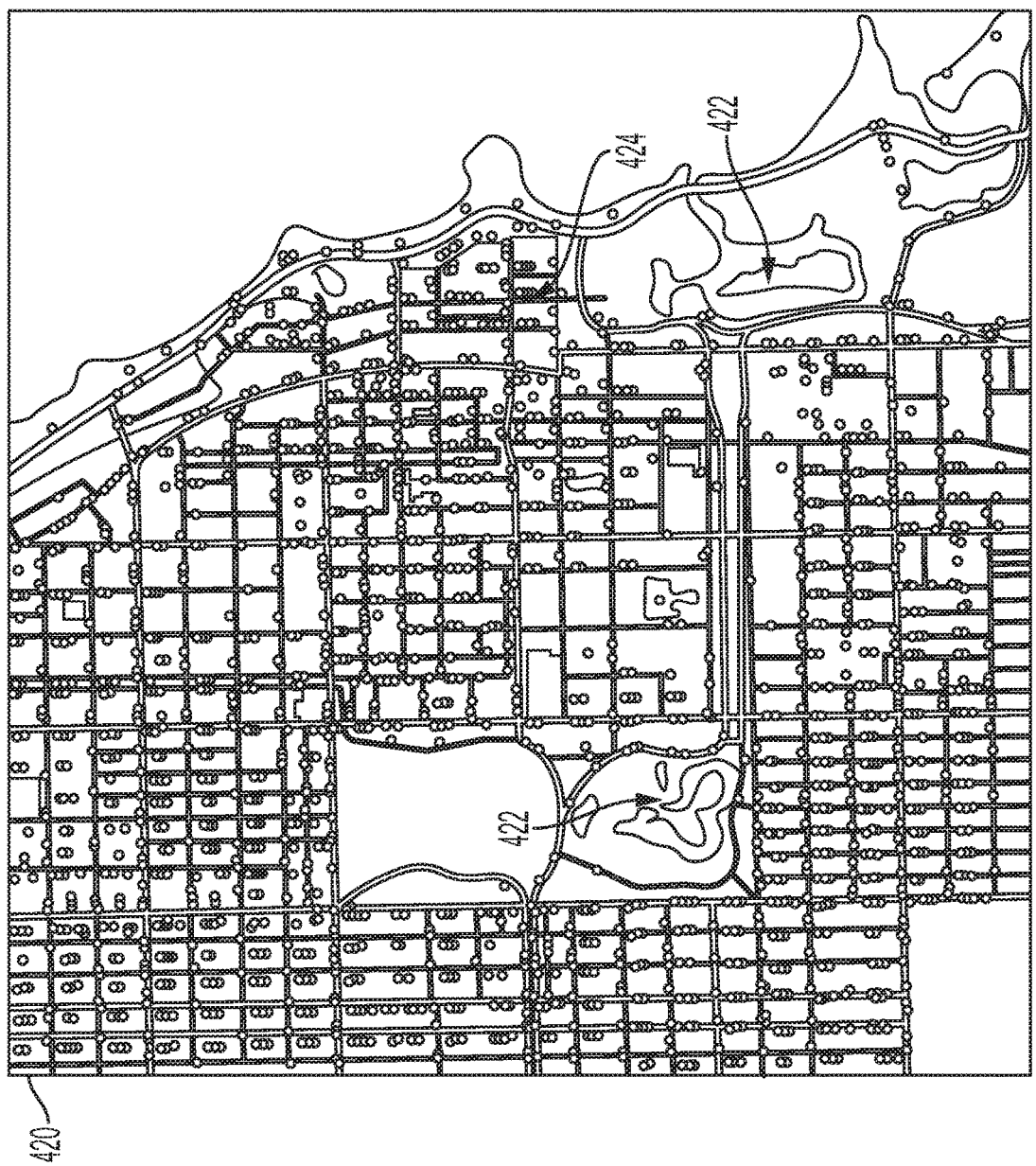
FIG. 4C depicts a crime map, in accordance with example embodiments.

As yet another example, FIG. 4C depicts a crime map 420. Individual tiles of map 420 may be coded in order to indicate crime rates. These tiles may appear as dots in FIG. 4C. The crimes may be some or all reported crimes in the tiles. For instance, on map 420, tiles of parks 422 may be coded as having lower crimes rates than tiles of commercial area 424. The data in map 420 may be gathered from various sources. It could be crowdsourced, based on surveys of residents, or gathered by local, state, or federal government entities. In certain embodiments only visible crimes are used.

A route segment, such as a city block, or a tile of the map may have a crime value that is the average or some aggregation or the crime values on or within a threshold distance of the route segment or tile. For instance, a route segment may have a crime value that is based on all crimes reported within 100 feet of either side of the route segment.

The coded crime values may be within a predefined range. For example, the predefined range could be 0 to 100, increasing with the amount of crime. Thus, a crime value near 0 indicates almost no crime on a tile, while a crime value near 100 indicates that the tile is crime-ridden. Other ranges could be used. Crimes may also be differentially weighted—for instance, violent crimes may be more heavily weighted than petty crimes when calculating a crime value for a tile.

In addition to greenspace maps, sound maps, and crime maps, other types of maps may be used. For example, data from sidewalk quality maps (e.g., containing values representing the smoothness, width, and age of a sidewalk), lighting quality maps (e.g., containing values representing how the area is lit), and storefront quality maps (e.g., containing values representing the aesthetic qualities of storefronts) could be incorporated as well. Additionally, map data could be generated by users to influence the routing. For example, users can report a construction site which temporarily changes sound levels, and thus other users would be routed away from the construction site.

Furthermore, any of the maps described herein could have different values based on the time of year or time of day. As an example of the latter, some route segments might have a low value in winter due to their sidewalks not being properly cleared, but high values in other seasons. Or, some route segments might have lower crime rates during the day than at night. In addition, greenspace may also change with season, i.e., the loss or gain of tree leaves, etc.

III. CALCULATING RESTORATIVE SCORE

Greenspace maps, sound maps, and crime maps can be overlaid on a geographic map (e.g., maps 400, 410, and 420 overlaid on map 300) as part of determining a restorative score for a tile or a route segment. For example, a particular tile size for map 300 may be selected (e.g., tiles of a square mile, a square acre, a city block, a 2-foot by 2-foot square, or some other size).

An example tile 500 is shown in FIG. 5A. Tile 500 is a tile from map 300, with greenspace data from map 400 (represented by the shaded swatch 502 running roughly horizontally across the map), noise data from map 410 (the dots 504), and crime data from map 420 (the triangle 506).

The data from the corresponding geographical area in maps 400, 410, and 420 are found, and the associated values are determined on a per-tile or per-route-segment basis. If more than one value from a particular map is found to be relevant to the geographical area of a tile or route segment, these values may be averaged or aggregated in some fashion. For instance, if a tile of map 400 corresponds to greenspace values of 50 and 60 in map 410, a greenspace value of 55 may be used.

Regardless, each tile, route segment, or other unit of map 300 may be associated with a greenspace value, a noise value, and a crime value. The restorative score for the tile may be calculated as a function of these three values. In embodiments where more than three, fewer than three or different values are used, the restorative score may be a function of those values.

In possible embodiments, the restorative score (RS) of a tile may increase with the greenspace (A) and noise values (B) for the tile, and decrease with the crime value (C) for the tile. This can be represented by the following equation:

$$RS = \delta\left(\frac{1 + \alpha A + \beta B}{\gamma + C}\right)$$

The values of δ, α, β, and γ are parameters that can be adjusted to fine tune the equation. For instance, they could all be set to 1 in some embodiments. Further, user feedback may be used to adjust these values. For example, users may be presented with a restorative score and asked to indicate whether this score is too high, too low, or about right given their experience. In some cases, this feedback may be provided to a machine learning model (e.g., based on a neural network, multivariate regression, nonlinear regression, gradient descent, linear programming, and so on) to ultimately determine values of δ, α, β, and γ that are a good fit for the observations or to determine if the function should be altered in non-linear ways to fit the perceived restorative values from users. Also, cognitive measures may be incorporated into the application (such as dual n-back, backwards digit span, etc.) to monitor how user performance on these tasks changes based on the recommended walk. This would provide objective measures of restorativeness.

Figure 5B:
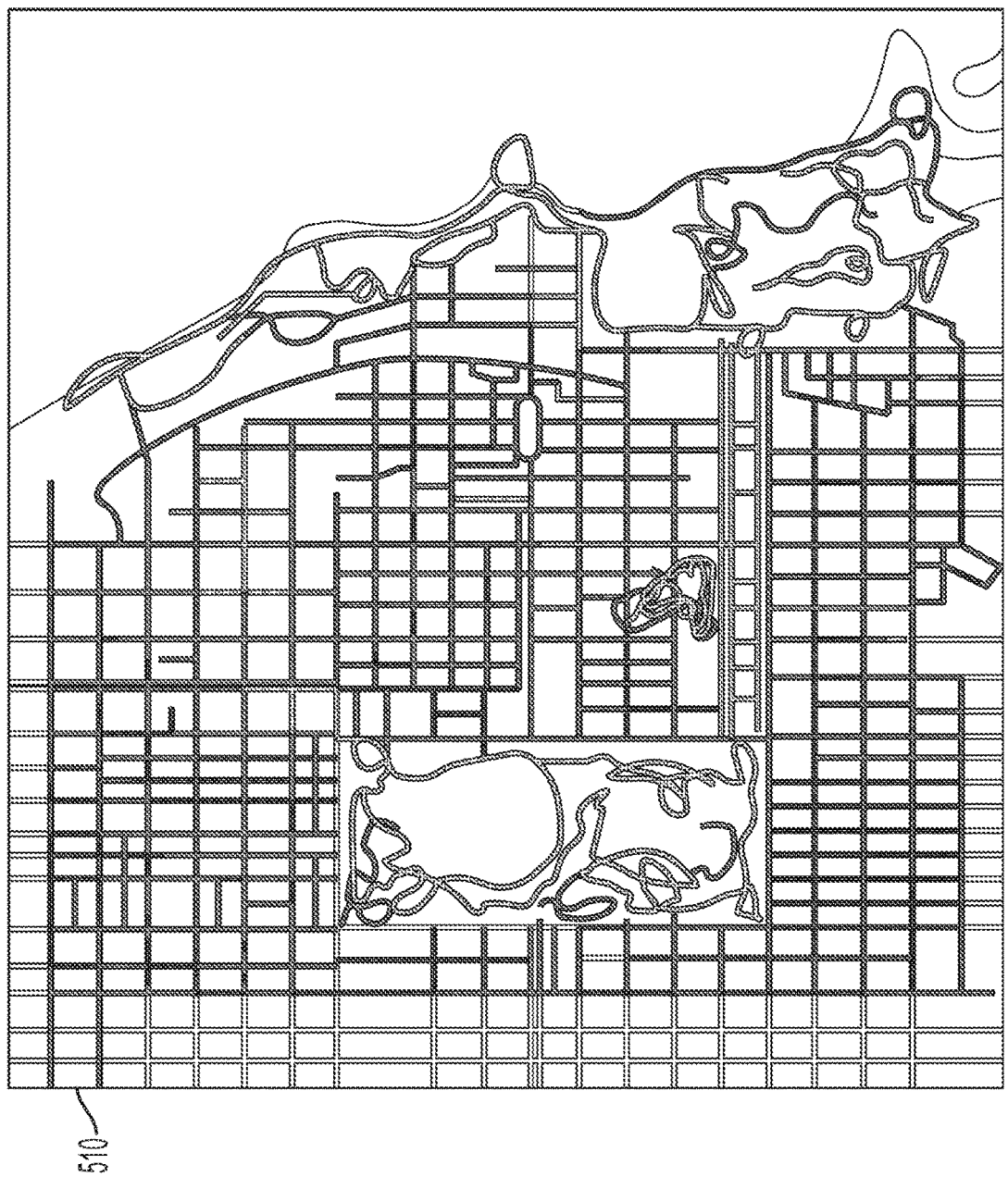
FIG. 5B depicts a map displayed by a navigation application with overlaid data from a greenspace map, a noise map, and a crime map, in accordance with example embodiments.

Based on the calculated restorative scores, a restorative map can be created. This map may be constructed from some number of individual tiles or locations, each with a restorative score. An example of such a map 510 is shown in FIG. 5B. Possible routes on map 510 are shaded in accordance with their restorative scores (segments with higher restorative scores have lighter shading and those with lower restorative scores have darker shading). For example, if the map represents route segments as weighted edges and intersections with vertices of a graph, each route segment may be assigned a restorative score based on the tile in which the route segment resides or and/or one or more nearby tiles. The restorative score of a route may be the sum of the restorative scores of each route segment therein, or may be calculated in a different fashion.

This information can be used when a navigation application is determining one or more suggested routes between two points on a map. Instead of or in addition to the shortest route (in terms of distance or time), the navigation application may display a suggested route with a restorative score that is higher than that of the shortest path. In other words, the navigation application may determine a plurality of shortest path routes (e.g., n) between the two points. The navigation application may then determine a restorative score for each of these routes. The navigation application may display one or more of the routes along with information regarding their restorative scores.

For instance, an objective function may be applied to each of n candidate routes. The objective function may be designed to weigh the length of each candidate route versus its restorative score. For instance, the objective function may take the form of:

$$O = \frac{\lambda L}{\mu RS}$$

where L is the length of a candidate route, RS is the restorative score of the candidate route, and where λ and μ are tunable parameters. Using this equation, one or more of the candidate routes with the lowest objective function values (e.g., including a route that minimizes the objective function) may be suggested.

In another embodiment, a user may be able to specify that they would like to be recommended a restorative route that is no more than a certain length or travel time longer than the shortest route. For instance, the user might specify that any suggested restorative route should take no more than 5 minutes longer to walk than the shortest path route.

Figure 6:
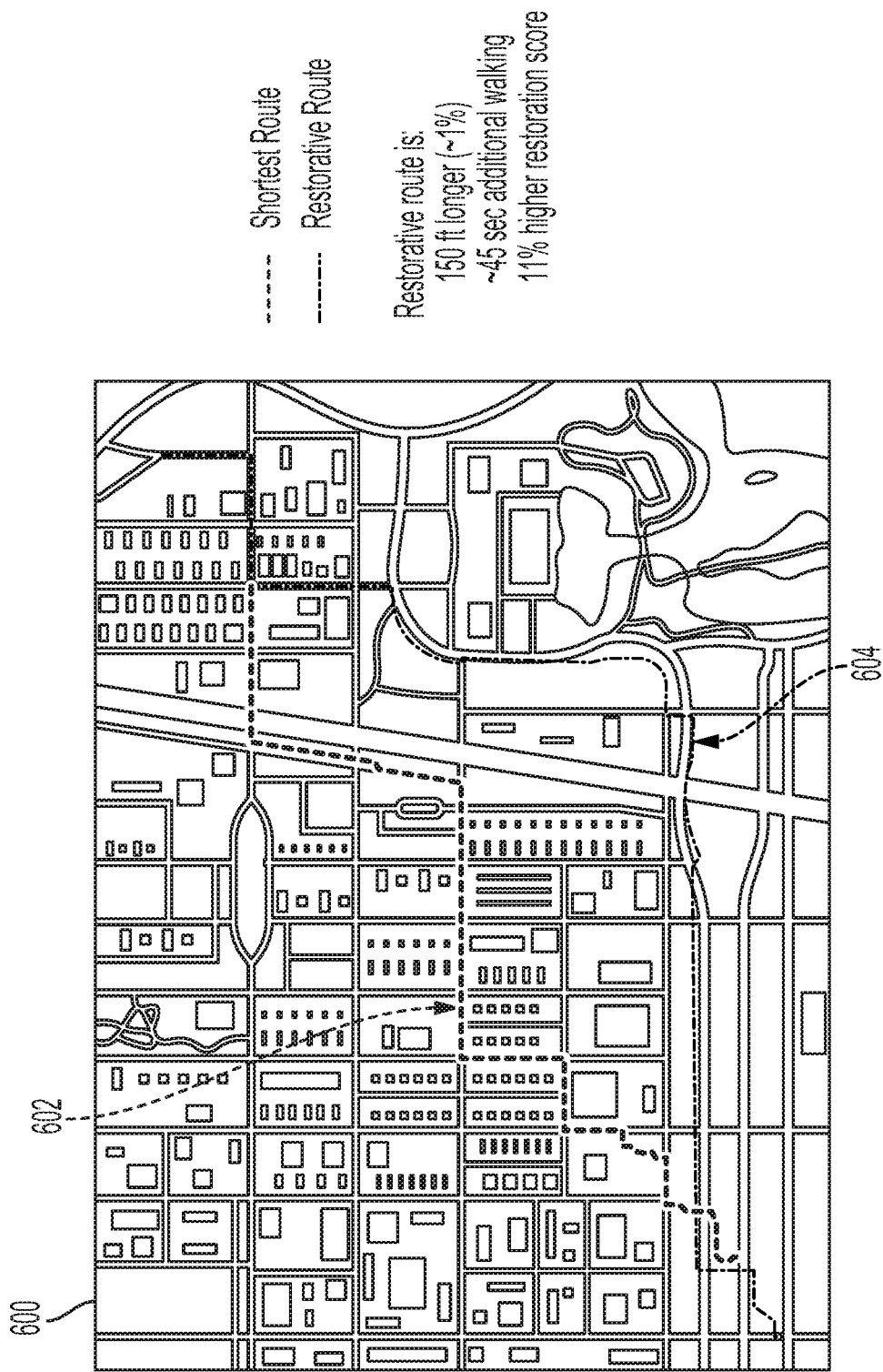
FIG. 6 depicts a map displayed by a navigation application that provides both a suggested shortest route and a suggested restorative route, in accordance with example embodiments.

As an example, FIG. 6 depicts a map 600 with route 602 and route 604 plotted between two points. As shown in the key to the right of map 600, route 602 is the shortest route (e.g., based on distance or travel time), and route 604 is a restorative route. In particular, the key states that route 604 is 1% longer than route 602 and is estimated to be about 45 seconds longer to walk. But, route 604 has a restorative score that is 11% higher than route 602. Thus, some users may prefer route 604 to route 602 due to the superior restorative nature of route 604.

The information displayed in FIG. 6 is merely for purpose of example. Map 600 may display just one route (e.g., the route with the highest restorative score) or more than two routes (e.g., several shortest routes and/or restorative routes).

In some cases, any of these tunable parameters (either from the calculation of RS or O) may be adjusted by a user of the navigation application. For instance, the navigation application may present the user with one or more menu options (e.g., sliders, drop down menus, radio buttons) that allow the user to directly or indirectly control the tradeoff between route length and restorative score. In embodiments, this may involve allowing the user to specify the relative importance of greenspace, noise, and crime. Alternatively or additionally, users may be able to take into account feedback and/or recommendation of other users as a factor in choosing restorative routes.

IV. EXAMPLE OPERATIONS

Figure 8:
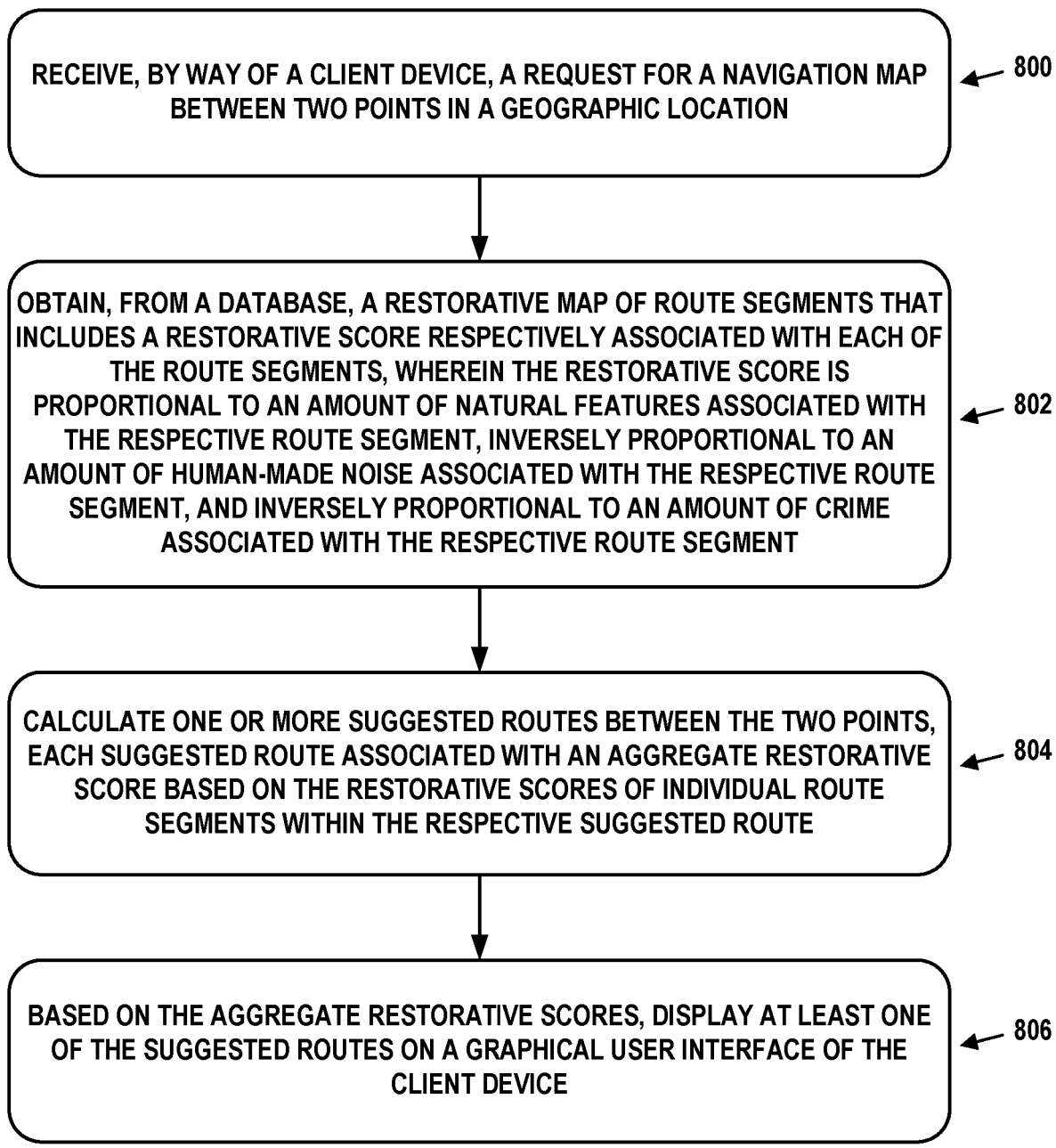
FIG. 8 is a flow chart, in accordance with example embodiments.

FIGS. 7 and 8 are flow charts illustrating example embodiments. The processes illustrated by FIGS. 7 and 8 may be carried out by a computing device, such as computing device 100, and/or a cluster of computing devices, such as server cluster 200. However, the processes can be carried out by other types of devices or device subsystems. For example, the processes could be carried out by a portable computer, such as a smartphone, laptop, or a tablet device.

The embodiments of FIGS. 7 and 8 may be simplified by the removal of any one or more of the features shown therein. Further, these embodiments may be combined with features, aspects, and/or implementations of any of the previous figures or otherwise described herein.

Block 700 of FIG. 7 may involve obtaining data representing a transportation map, a greenspace map, a noise map, and a crime map of a geographical location, where the transportation map represents route segments within the geographical location, where the greenspace map represents natural features within the geographical location, where the noise map represents human-made noise within the geographical location, and where the crime map represents reported crimes within the geographical location.

Block 702 may involve, for each of the route segments: (i) calculating a restorative score, wherein the restorative score is proportional to an amount of natural features associated with the respective route segment in the greenspace map, inversely proportional to an amount of human-made noise associated with the respective route segment in the noise map, and inversely proportional to an amount of crime associated with the respective route segment in the crime map, and (ii) storing, in a database, the restorative scores as calculated along with each respective route segment.

Some embodiments may further involve displaying, on a graphical user interface of a computing device, a representation of the transportation map with the restorative scores visually encoded for each of the route segments. The visual encoding may be a color encoding of the restorative scores.

In some embodiments, the greenspace map represents natural features with respective greenspace values, the greenspace values based on images of the respective route segments or greenspace input from individuals (these images may include photographs, infrared, RADAR, LIDAR, and other types of images). In some embodiments, the greenspace map incorporates the calculated naturalness of human-made features.

In some embodiments, the noise map represents human-made noise with respective noise values, the noise values based on the human-made structures within a first threshold range of the respective route segments, noise measurements made within a second threshold range of the respective route segments, or noise input from individuals.

In some embodiments, the crime map represents reported crimes with respective crime values, the crime values based on governmental reports of crime within a threshold range of the respective route segments or crime input from individuals.

In some embodiments, the restorative scores are also based on one or more of a sidewalk quality map, containing values representing the smoothness, width, or age of sidewalks within the geographical location, a lighting quality map containing values representing how well the geographical location is lit, a construction site map representing temporary noise and/or sidewalk disruptions, or storefront quality maps containing values representing the aesthetic qualities of storefronts within the geographical location.

Turning to FIG. 8, block 800 may involve receiving, by way of a client device, a request for a navigation map between two points in a geographic location.

Block 802 may involve obtaining, from a database, a restorative map of route segments that includes a restorative score respectively associated with each of the route segments, where the restorative score is proportional to an amount of natural features associated with the respective route segment, inversely proportional to an amount of human-made noise associated with the respective route segment, and inversely proportional to an amount of crime associated with the respective route segment.

Block 804 may involve calculating one or more suggested routes between the two points, each suggested route associated with an aggregate restorative score based on the restorative scores of individual route segments within the respective suggested route.

Block 806 may involve, based on the aggregate restorative scores, displaying at least one of the suggested routes on a graphical user interface of the client device.

In some embodiments, the restorative map also includes a physical distance associated with each of the route segments. A suggested route may be selected for display based on an aggregate physical distance of the suggested route and the aggregate restorative score of the suggested route. An objective function is calculated for each of the one or more suggested routes, where the objective function for a particular suggested route is based on a quotient of an aggregate physical distance of the particular suggested route divided by the aggregate restorative score of the particular suggested route. Each of the suggested routes might be no longer than a threshold amount from an aggregate physical distance of a shortest route of the suggested routes.

In some embodiments, the restorative map also includes a travel time associated with each of the route segments. A suggested route may be selected for display based on an aggregate travel time of the suggested route and the aggregate restorative score of the suggested route. An objective function is calculated for each of the one or more suggested routes, where the objective function for a particular suggested route is based on a quotient of an aggregate travel time of the particular suggested route divided by the aggregate restorative score of the particular suggested route. Each of the suggested routes might be no longer than a threshold amount from an aggregate travel time of a shortest route of the suggested routes.

V. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
   receiving, by way of a client device, a request for a navigation map between two points in a geographic location;
   obtaining, from a database, a restorative map of route segments that includes a restorative score respectively associated with each of the route segments, wherein the restorative score has been calculated to increase with an amount of natural features associated with the respective route segment, decrease with an amount of human-made noise associated with the respective route segment, and decrease with an amount of crime associated with the respective route segment;
   calculating one or more suggested routes between the two points, each suggested route associated with an aggregate restorative score based on the restorative scores of individual route segments within the respective suggested route; and
   based on the aggregate restorative scores, displaying at least one of the suggested routes on a graphical user interface of the client device, wherein a suggested route is selected for display based on an aggregate physical distance of the suggested route and the aggregate restorative score of the suggested route, wherein an objective function is calculated for each of the one or more suggested routes, wherein the objective function for the suggested route is based on a quotient of the aggregate physical distance of the suggested route divided by the aggregate restorative score of the suggested route.

2. The computer-implemented method of claim 1, wherein the restorative map also includes a physical distance associated with each of the route segments.

3. The computer-implemented method of claim 2, wherein each of the suggested routes is no longer than a threshold amount from an aggregate physical distance of a shortest route of the suggested routes.

4. The computer-implemented method of claim 1, wherein the restorative map also includes a travel time associated with each of the route segments.

5. The computer-implemented method of claim 4, wherein the suggested route is further selected for display based on an aggregate travel time of the suggested route and the aggregate restorative score of the suggested route.

6. The computer-implemented method of claim 4, wherein a further objective function is calculated for each of the one or more suggested routes, wherein the objective function for the suggested route is based on a quotient of the aggregate travel time of the suggested route divided by the aggregate restorative score of the suggested route.

7. The computer-implemented method of claim 4, wherein each of the suggested routes is no longer than a threshold amount from an aggregate travel time of a shortest route of the suggested routes.

8. An article of manufacture including a non-transitory computer-readable medium, having stored thereon program instructions that, upon execution by a computing device, cause the computing device to perform operations comprising:
 receiving, by way of a client device, a request for a navigation map between two points in a geographic location;
 obtaining, from a database, a restorative map of route segments that includes a restorative score respectively associated with each of the route segments, wherein the restorative score has been calculated to increase with an amount of natural features associated with the respective route segment, decrease with an amount of human-made noise associated with the respective route segment, and decrease with an amount of crime associated with the respective route segment;
 calculating one or more suggested routes between the two points, each suggested route associated with an aggregate restorative score based on the restorative scores of individual route segments within the respective suggested route; and
 based on the aggregate restorative scores, displaying at least one of the suggested routes on a graphical user interface of the client device, wherein a suggested route is selected for display based on an aggregate physical distance of the suggested route and the aggregate restorative score of the suggested route, wherein an objective function is calculated for each of the one or more suggested routes, wherein the objective function for the suggested route is based on a quotient of the aggregate physical distance of the suggested route divided by the aggregate restorative score of the suggested route.

9. The article of manufacture of claim 8, wherein the restorative map also includes a physical distance associated with each of the route segments.

10. The article of manufacture of claim 9, wherein each of the suggested routes is no longer than a threshold amount from an aggregate physical distance of a shortest route of the suggested routes.

11. The article of manufacture of claim 8, wherein the restorative map also includes a travel time associated with each of the route segments.

12. The article of manufacture of claim 11, wherein the suggested route is further selected for display based on an aggregate travel time of the suggested route and the aggregate restorative score of the suggested route.

13. The article of manufacture of claim 11, wherein a further objective function is calculated for each of the one or more suggested routes, wherein the objective function for the suggested route is based on a quotient of the aggregate travel time of the suggested route divided by the aggregate restorative score of the suggested route.

14. The article of manufacture of claim 11, wherein each of the suggested routes is no longer than a threshold amount from an aggregate travel time of a shortest route of the suggested routes.

15. A computer-implemented method comprising:
 obtaining data representing a transportation map, a greenspace map, a noise map, and a crime map of a geographical location, wherein the transportation map represents route segments within the geographical location, wherein the greenspace map represents natural features within the geographical location, wherein the noise map represents human-made noise within the geographical location, and wherein the crime map represents reported crimes within the geographical location;
 calculating a respective restorative score for each of the route segments, wherein the respective restorative score increases with an increasing amount of natural features associated with the respective route segment in the greenspace map, decreases with an increasing amount of human-made noise associated with the respective route segment in the noise map, and decreases with an increasing amount of crime associated with the respective route segment in the crime map;
 calculating a suggested route between two points, the suggested route associated with an aggregate restorative score based on the restorative scores of individual route segments within the suggested route, wherein an objective function is calculated for the suggested route based on a quotient of an aggregate physical distance of the suggested route divided by the aggregate restorative score of the suggested route; and
 storing, in a database, the respective restorative scores as calculated with each respective route segment.

16. The computer-implemented method of claim 15, further comprising:
 displaying, on a graphical user interface of a computing device, a representation of the transportation map with the restorative scores color encoded for each of the respective route segments, wherein the greenspace map represents natural features with respective greenspace values, the greenspace values based on images of the respective route segments or greenspace input from individuals, wherein the noise map represents human-made noise with respective noise values, the respective noise values based on human-made structures within a first threshold range of the respective route segments, noise measurements made within a second threshold range of the respective route segments, or noise input from individuals, and wherein the crime map represents reported crimes with respective crime values, the respective crime values based on governmental reports of crime within a threshold range of the respective route segments or crime input from individuals.

17. A computer-implemented method comprising:
 receiving, by way of a client device, a request for a navigation map between two points in a geographic location;
 obtaining, from a database, a restorative map of route segments that includes a restorative score respectively associated with each of the route segments, wherein the restorative score has been calculated to increase with an amount of natural features associated with the respective route segment, decrease with an amount of human-made noise associated with the respective route segment, and decrease with an amount of crime associated with the respective route segment;
 calculating one or more suggested routes between the two points, each suggested route associated with an aggregate restorative score based on the restorative scores of individual route segments within the respective suggested route; and
 based on the aggregate restorative scores, displaying at least one of the suggested routes on a graphical user interface of the client device, wherein a suggested route is selected for display based on an aggregate travel time of the suggested route and the aggregate restorative score of the suggested route, wherein an objective function is calculated for each of the one or more suggested routes, wherein the objective function for the suggested route is based on a quotient of the aggregate travel time of the suggested route divided by the aggregate restorative score of the suggested route.

18. An article of manufacture including a non-transitory computer-readable medium, having stored thereon program instructions that, upon execution by a computing device, cause the computing device to perform operations comprising:

receiving, by way of a client device, a request for a navigation map between two points in a geographic location;

obtaining, from a database, a restorative map of route segments that includes a restorative score respectively associated with each of the route segments, wherein the restorative score has been calculated to increase with an amount of natural features associated with the respective route segment, decrease with an amount of human-made noise associated with the respective route segment, and decrease with an amount of crime associated with the respective route segment;

calculating one or more suggested routes between the two points, each suggested route associated with an aggregate restorative score based on the restorative scores of individual route segments within the respective suggested route; and based on the aggregate restorative scores, displaying at least one of the suggested routes on a graphical user interface of the client device, wherein a suggested route is selected for display based on an aggregate travel time of the suggested route and the aggregate restorative score of the suggested route, wherein an objective function is calculated for each of the one or more suggested routes, wherein the objective function for the suggested route is based on a quotient of the aggregate travel time of the suggested route divided by the aggregate restorative score of the suggested route.

19. A computer-implemented method comprising:

obtaining data representing a transportation map, a greenspace map, a noise map, and a crime map of a geographical location, wherein the transportation map represents route segments within the geographical location, wherein the greenspace map represents natural features within the geographical location, wherein the noise map represents human-made noise within the geographical location, and wherein the crime map represents reported crimes within the geographical location;

calculating a respective restorative score for each of the route segments, wherein the respective restorative score increases with an increasing amount of natural features associated with the respective route segment in the greenspace map, decreases with an increasing amount of human-made noise associated with the respective route segment in the noise map, and decreases with an increasing amount of crime associated with the respective route segment in the crime map;

calculating a suggested route between two points, the suggested route associated with an aggregate restorative score based on the restorative scores of individual route segments within the suggested route, wherein an objective function is calculated for the suggested route based on a quotient of an aggregate travel time of the suggested route divided by the aggregate restorative score of the suggested route; and storing, in a database, the respective restorative scores as calculated with each respective route segment.

* * * * *